United States Patent
Zhang et al.

(10) Patent No.: US 7,983,515 B2
(45) Date of Patent: Jul. 19, 2011

(54) POLARIZATION MAINTAINING OPTICAL FIBER POLARIZER

(75) Inventors: Sheng Zhang, Hackensack, NJ (US); Victor Il'ich Kopp, Fair Lawn, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 32 days.

(21) Appl. No.: 12/642,603

(22) Filed: Dec. 18, 2009

(65) Prior Publication Data
US 2011/0002579 A1    Jan. 6, 2011

Related U.S. Application Data

(60) Provisional application No. 61/138,912, filed on Dec. 18, 2008.

(51) Int. Cl.
*G02B 6/24* (2006.01)
(52) U.S. Cl. .......................................... 385/11
(58) Field of Classification Search .............. 385/11–16, 385/27, 31, 37, 40, 129, 130, 131, 123, 125, 385/126, 28, 29, 42
See application file for complete search history.

(56) References Cited

U.S. PATENT DOCUMENTS

| | | | | |
|---|---|---|---|---|
| 4,607,912 A * | 8/1986 | Burns et al. | | 385/11 |
| 6,529,676 B2 * | 3/2003 | Eggleton et al. | | 385/142 |
| 6,801,686 B2 * | 10/2004 | Sorin | | 385/28 |
| 6,922,495 B2 * | 7/2005 | Sorin et al. | | 385/11 |
| 7,095,911 B2 * | 8/2006 | Kopp et al. | | 385/11 |
| 7,315,665 B1 * | 1/2008 | Anderson | | 385/11 |
| 7,567,734 B2 * | 7/2009 | Dai et al. | | 385/12 |
| 2002/0146223 A1 * | 10/2002 | Sorin et al. | | 385/123 |
| 2005/0135740 A1 * | 6/2005 | Kopp et al. | | 385/28 |

* cited by examiner

*Primary Examiner* — Akm E Ullah
(74) *Attorney, Agent, or Firm* — Edward Etkin, Esq.

(57) ABSTRACT

A novel in-fiber polarizer is provided that is implemented in an optical fiber structure based on a polarization maintaining ("PM") optical fiber, and that is configured to impart a pre-determined desired polarization to a light signal transmission of a predetermined at least one wavelength transmitted therethrough. The inventive polarizer comprises a PM optical fiber structure, with an entry end for receiving incident light and an exit end for outputting polarized light, having an optical fiber core, having at least one core mode and a core propagation constant, surrounded by a cladding, having at least one cladding mode and a cladding propagation constant, that further comprises a reduced core diameter region of a predetermined length between its entry and exit ends, wherein various predefined parameters of the modified PM optical fiber structure, including but not being limited to, the core and cladding propagation constants, the value of the reduced core diameter, and the length of the reduced core diameter region are selected and configured to produce a constructive interference for one light polarization of the input light signal, corresponding to the desired polarization, and to produce a destructive interference for a polarization orthogonal to the desired polarization, to thereby only output, at the polarizer exit end, the desired polarization component of the light signal transmission at the at least one wavelength. Additional embodiments of the inventive polarizer include multiple sequential polarizer structures with specially configured interconnects.

6 Claims, 2 Drawing Sheets

POLARIZATION MAINTAINING OPTICAL FIBER POLARIZER

CROSS REFERENCE TO RELATED APPLICATIONS

The present patent application claims priority from the commonly assigned U.S. provisional patent application 61/138,912 entitled "Polarization Maintaining Optical Fiber Polarizer", filed Dec. 18, 2008.

FIELD OF THE INVENTION

The present invention relates generally to polarizers, and more particularly to a polarizer based on a polarization maintaining optical fiber, that is capable of being fabricated and/or positioned in-line with the optical fiber itself, and that would be relatively inexpensive to produce.

BACKGROUND OF THE INVENTION

Any device that requires polarized light, uses one or more polarizers. Polarizers have many industrial applications. For example, polarizers may be utilized in electro-optical modulators and laser subsystems. In essence, a polarizer eliminates an undesirable light component of a first polarization, and allows a desirable light component of a second polarization to pass through.

Of particular interest is the use of polarizers as in-line modules in optical fibers. Previously known in-line polarizers typically comprise an assembly with a first lens following a first optical fiber for collimating the light emerging from the fiber. The collimated light then passes though a polarizer plate and is then focused by a second lens into a second optical fiber. The main disadvantage of this type of polarizer is that it is relatively expensive and difficult to construct. Furthermore, the lens-based polarizer interrupts the optical fiber leading to optical loss, undesirable reflection, and reduced stability. Finally, the lens-based polarizer introduces a device into the fiber that is larger than the fiber, thereby causing potential space issues.

One attempt to solve the above problems was the development of another in-line fiber polarizer that was constructed by wrapping the optical fiber in several loops around a circular member before allowing the fiber to continue on its way. This arrangement eliminated some of the drawbacks of the previously known lens-based polarizer—for example this was a true in-fiber device that did not interrupt the fiber with a larger device. However, the coil-based polarizer suffered from another significant drawback—the coil element around which the fiber needed to be wrapped was typically many centimeters in diameter making the coil-based polarizer very bulky and difficult or impossible to use in many applications.

A novel in-fiber polarizer, that advantageously solved all of the problems of the prior art polarizers was disclosed in a commonly assigned U.S. Pat. No. 6,721,469, issued on Apr. 13, 2004, and entitled "Chiral In-Fiber Adjustable Polarizer Apparatus and Method" (hereinafter the "Adjustable Polarizer patent"), which is hereby incorporated by reference in its entirety. That novel polarizer worked with circularly polarized light and utilized a fiber component that effectively functioned as a quarter-wave plate to convert circular polarization into linear polarization over a relatively narrow frequency band. The fact that polarization conversion only happens across a narrow frequency band, is one of the chief limitations and drawbacks of quarter-wave plates and quarter-wave plate-type devices. In addition, since most practical applications utilize linearly polarized light (for example, light transmitted through standard polarization-maintaining fibers), the polarizer disclosed in the Adjustable Polarizer patent required conversion of linearly polarized light into circularly polarized light prior to entering the polarizer.

Another novel in-fiber polarizer solution was provided in the commonly assigned U.S. Pat. No. 7,095,911 issued on Aug. 22, 2006, and entitled "Chiral In-Fiber Polarizer Apparatus and Method" (hereinafter the "Chiral Polarizer patent"), which was directed to a chiral in-fiber polarizer implemented in a chiral fiber structure having a novel pitch variation along its length between the entry and exit ends in accordance with a predetermined desirable pitch profile that may be advantageously selected to correspond to one or more predetermined pitch configurations. In accordance with the inventive embodiments disclosed in the Chiral Polarizer patent, at least one of various parameters of the chiral structure, including, but not limited to, the core and cladding refractive indices and sizes, and the pitch profile, may be configured and selected to substantially eliminate the undesirable polarization component of the incident light by achieving an optimized extinction ratio within a desired spectral range. The in-fiber chiral polarizer disclosed in the Chiral Polarizer patent, was also configurable into an arrangement enabling significant reduction of insertion loss of the incident light entering the entry end thereof.

However, the various embodiments of both solutions disclosed in the above-discussed Adjustable Polarizer and Chiral Polarizer patents, involved the use of chiral fiber structures which may be difficult to fabricate in-line with conventional fibers (and which would typically be spliced in-line with conventional fibers during use), and which, in certain embodiments thereof, would need to utilize one or more optical fiber couplers (such as disclosed in the commonly assigned U.S. Pat. No. 7,308,173, issued on Dec. 11, 2007, entitled "Optical Fiber Coupler with Low Loss and High Coupling Coefficient and Method of Fabrication Thereof"). Additionally, for certain applications, it is useful to have an in-line polarizer configured to operate at only at least one predetermined wavelength.

It would thus be desirable to provide an in-line polarizer that does not interrupt an optical fiber with a larger structure. It would additional be desirable to provide an in-line polarizer configured to operate at only at least one predetermined wavelength. It would further be desirable to provide an in-line polarizer that may be readily fabricated and/or positioned in-line with a polarization maintaining optical fiber. It would also be desirable to provide an in-line polarizer that is inexpensive and easy to fabricate.

SUMMARY OF THE INVENTION

Figure 1:
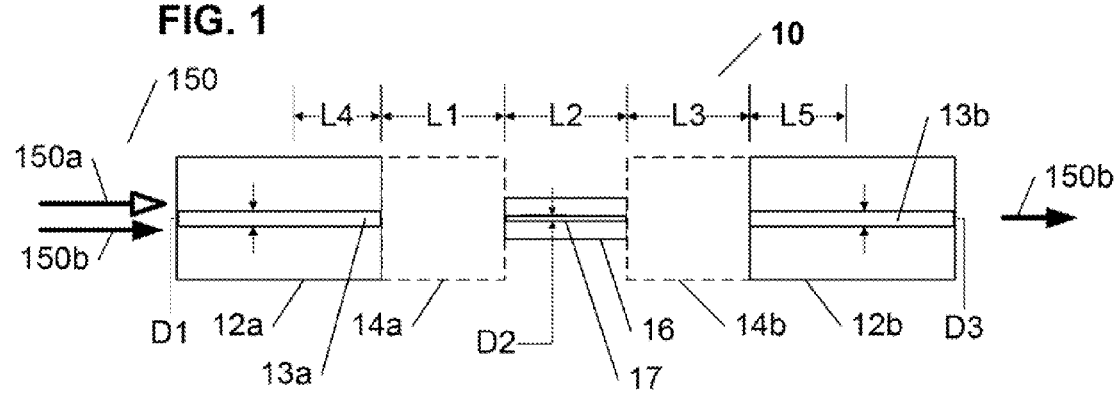
FIG. 1 is a schematic diagram of a side view of a first exemplary embodiment of the polarization maintaining optical fiber polarizer of the present invention.

A novel in-fiber polarizer is provided that is implemented in an optical fiber structure based on a polarization maintaining ("PM") optical fiber, and that is configured to impart a predetermined desired polarization to a light signal transmission of a predetermined at least one wavelength transmitted therethrough.

The inventive polarizer comprises a PM optical fiber structure, with an entry end for receiving incident light and an exit end for outputting polarized light, having an optical fiber core, having at least one core mode and a core propagation constant, surrounded by a cladding, having at least one cladding mode and a cladding propagation constant, that further comprises a reduced core diameter region of a predetermined length between its entry and exit ends, wherein various predefined parameters of the modified PM optical fiber structure, including but not being limited to, the core and cladding propagation constants, the value of the reduced core diameter, and the length of the reduced core diameter region are selected and configured to produce a constructive interference for one light polarization of the input light signal, corresponding to the desired polarization, and to produce a destructive interference for a polarization orthogonal to the desired polarization, to thereby only output, at the polarizer exit end, the desired polarization component of the light signal transmission at the at least one wavelength.

Additional embodiments of the inventive polarizer include multiple sequential polarizer structures with specially configured interconnects.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to a novel in-fiber polarizer implemented in an optical fiber structure based on a polarization maintaining ("PM") optical fiber, and that is configured to impart a predetermined desired polarization to a light signal transmission of a predetermined at least one wavelength transmitted therethrough. In summary, the inventive polarizer comprises a PM optical fiber structure, with an entry end for receiving incident light and an exit end for outputting polarized light, having an optical fiber core, having at least one core mode and a core propagation constant, surrounded by a cladding, having at least one cladding mode and a cladding propagation constant, that further comprises a reduced core diameter region of a predetermined length between its entry and exit ends, wherein various predefined parameters of the modified PM optical fiber structure, including but not being limited to, the core and cladding propagation constants, the value of the reduced core diameter, and the length of the reduced core diameter region are selected and configured to produce a constructive interference for one light polarization of the input light signal, corresponding to the desired polarization, and to produce a destructive interference for a polarization orthogonal to the desired polarization, to thereby only output, at the polarizer exit end, the desired polarization component of the light signal transmission at the least one wavelength.

Before describing the various embodiments of the inventive polarizer in greater detail, it would be advantageous to provide an explanation of the scientific principles behind its utilization of constructive and destructive interference. A conventional PM fiber comprises a core with a core mode and a cladding with a cladding mode. Tapering down a PM fiber, causes at least partial coupling of light passing therethrough from the core mode into the cladding mode, and if, after a certain distance, the PM fiber is then tapered up (as an inverse "mirror image" of the initial taper), it is expected that the same core mode that was previously coupled into the cladding mode, would be coupled back into the core mode. However, when the transmission spectrum for such a structure is examined, at a particular wavelength almost unity of transmission may be observed from core to cladding and then back to core, but at a different wavelength the transmission may be suppressed almost to zero. This is due to interference involved with transmission of the portion of the core light that was coupled to the cladding, and then back to the core, when it is added with the portion of the light that continued traveling through core directly (i.e., that was not coupled into the cladding). When the coupled light has the same phase as the transmitted light, then constructive interference occurs, while when the coupled light is of an opposite phase, then destructive interference occurs.

In accordance with the present invention, the above-described modified PM optical fiber structure (having a reduced core diameter region therein), is selected to have two different propagation constants for "fast" and for "slow" polarization, to produce a desirable arrangement of constructive and destructive interference in the inventive polarizer, which is then applied in a predetermined desirable manner to impart, by way of constructive interference, a predetermined specific polarization to the light signal transmission at a predetermined at least one wavelength transmitted therethrough, and to scatter, by way of destructive interference, the undesirable polarization component of the light signal, by selecting and configuring various parameters of the modified PM optical fiber structure, such as the propagation constants, the length of the reduced diameter region and the value of the reduced core (and optionally of the reduced cladding) diameter therein, and the lengths of diameter transition regions on either end of the reduced core diameter portion of the structure.

Referring now to FIG. 1, a first embodiment of an inventive in-fiber polarizer 10 is shown, for imparting a predetermined desired polarization 150b to a light signal transmission 150 of a predetermined at least one wavelength transmitted therethrough. The polarizer 10, is positioned between a first PM fiber section 12a, comprising a core 13a of diameter D1 and a cladding, at its input end, and a second PM fiber section 12b, comprising a core 13b of diameter D3 and a cladding at its output end, respectively (with D1 and D3 being preferably the same, but which may differ), having at least one core mode and at least one cladding mode, and comprises a reduced diameter section 16 of a length L2, having a core 17 of a diameter D2 (being smaller than D1, D3), disposed between a first diameter transition region 14a of a length L1, and a second diameter transition region 14a of a length L3. The polarizer 10 preferably comprises two propagation constants (e.g., core and cladding propagation constants), that each correspond to one of a "fast" and of a "slow" polarization components of the input light signal 150.

In accordance with the present invention, the values of the core and cladding propagation constants, L1, L2, and L3, and D2, are selected and configured to first partially couple at least one core mode of the light signal 150, to at least one polarizer 10 cladding mode, and then partially couple the coupled light signal back into at least one of the at least one polarizer 10 core mode and at least one other polarizer 10 cladding mode, and are further selected and configured to produce constructive interference for one light polarization of the light signal 150, corresponding to the desired polarization, and to produce destructive interference for polarization orthogonal to the desired polarization, to thereby impart a polarizing effect on the core mode light signal transmission at the at least one wavelength transmitted therethrough, resulting in the output light signal 150b, at the polarizer 10 output, having the desired polarization, and being of the at least one predetermined wavelength.

It should be noted that, while the reduced core diameter section 16 is shown as having a cladding of a smaller diameter than that of sections 12a, 12b, in at least one embodiment of the present invention (by way of example shown in FIG. 3 and described in connection therewith), the cladding of section 16, may be of substantially the same diameter as the claddings of sections 12, 12b (as long as D2 is smaller than D1, D3). Furthermore, it should also be noted that, while the diameter transition regions 14a, 14b are shown in FIG. 1 to be of respective lengths L1, L3, in at least one embodiment of the present invention (by way of example shown in FIG. 3 and described in connection therewith), the lengths L1 and L3 may substantially be equal to zero (essentially resulting in abrupt core diameter transitions with D1, reduced abruptly to D2 for the length L2, and then abruptly increased to D3 thereafter, in which embodiment, the PM fiber sections 12a and 12b, of lengths L4, and L5, respectively, along with the reduced core diameter section 16 therebetween, would constitute the entire structure of the inventive polarizer 10.

Figure 2:
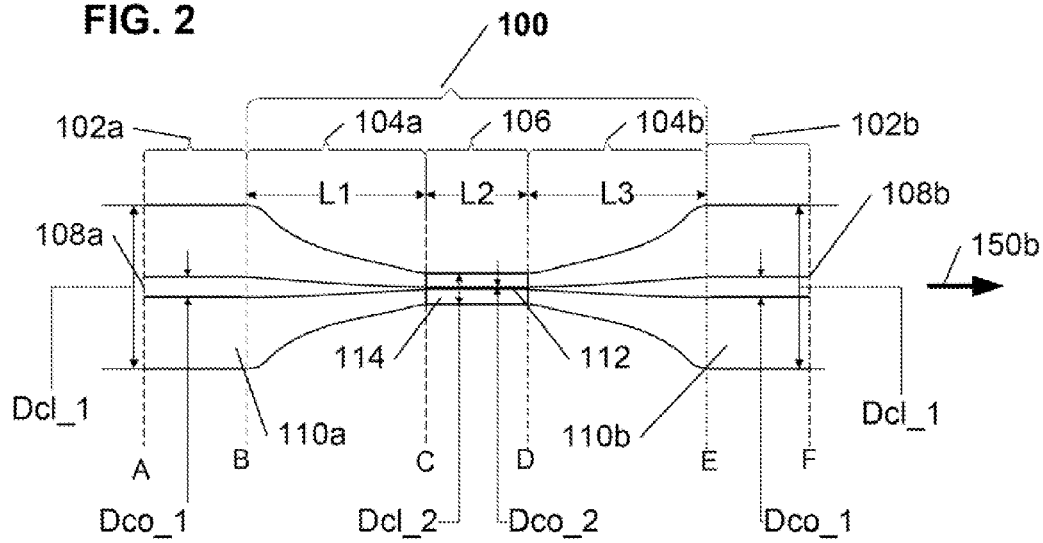
FIG. 2 is a schematic diagram of a side view of a first exemplary alternate embodiment of the polarization maintaining optical fiber polarizer of FIG. 1.

Referring now to FIG. 2, a first exemplary alternate embodiment of the polarizer 10 of FIG. 1, is shown as a polarizer 100, which is configured, and which operates, in substantially the same manner as described above in connection with the polarizer 10 of FIG. 1. The polarizer 100, is positioned between a first PM fiber section 102a, comprising a core 108a of diameter Dco_1 and a cladding 110a of a diameter Dcl_1, at its input end B, and a second PM fiber section 102b, comprising a core 108b of diameter Dco_1 and a cladding 110b of a diameter Dcl_1 at its output end E, respectively, with the cores 108a, 108b having at least one core mode, and the claddings 110a, 110b, having at least one cladding mode.

The polarizer 100 comprises a first diameter transition section 104a of a length L1, across which, the core 108a diameter Dco_1 and the cladding 110a diameter Dcl_1, are reduced (e.g., via tapering down) to smaller values Dco_2 and Dcl_2, followed by a reduced core diameter section 106 of a length L2, with a core 112 of a diameter Dco_2 and a cladding 114 with a diameter Dcl_2, which is then followed by a second diameter transition section 104b, of a length L3, across which, the core 112 diameter Dco_2 and the cladding 114 diameter Dcl_2, are increased (e.g., via tapering up) to higher values Dco_1 and Dcl_1, of the core 108b, and cladding 110b, respectively. The polarizer 100 preferably comprises two propagation constants (e.g., respective core 108a, 108b, 112 and cladding 110a, 110b, 114 propagation constants), that each correspond to one of a "fast" and of a "slow" polarization components of the input light signal 150.

In accordance with the present invention, the values of the respective core 108a, 108b, 112 and cladding 110a, 110b, 114 propagation constants, L1, L2, and L3, and Dco_2 (and optionally of Dcl_2), are selected and configured to first partially couple at least one core mode of the light signal 150, to at least one polarizer 100 cladding mode, and then partially couple the coupled light signal back into at least one of the at least one polarizer 100 core mode, and are further selected and configured to produce a constructive interference for one light polarization of the light signal 150, corresponding to the desired polarization, and to produce a destructive interference for a polarization orthogonal to the desired polarization, to thereby impart a polarizing effect on the core mode light signal transmission at the least one wavelength transmitted therethrough, resulting in the output light signal 150b, at the polarizer 100 output E, having the desired polarization, and being of the at least one predetermined wavelength.

Advantageously, the inventive polarizer 100 may be fabricated in-line within a specific section of a PM optical fiber that may extend from points A and B, shown in FIG. 2, or it may be configured as a "splice-in" component with either point B as input and point E as output, or to facilitate easier splicing, it may include unmodified sections 102a, 102b, at its respective ends, such that the component structure incorporating the polarizer 100, begins at a point A serving as the component input, and ends with the point F, serving as the component structure output.

Figure 3:
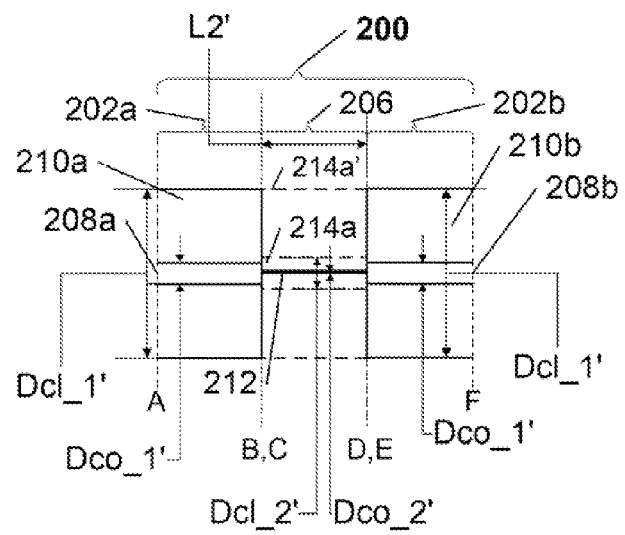
FIG. 3 is a schematic diagram of a side view of a second exemplary alternate embodiment of the polarization maintaining optical fiber polarizer of FIG. 1.

Referring now to FIG. 3, a second exemplary alternate embodiment of the polarizer 10 of FIG. 1, is shown as a polarizer 200. The polarizer 200, comprises a first PM fiber section 202a, comprising a core 208a of diameter Dco_1' and a cladding 210a of a diameter Dcl_1' at its input end A, followed by a reduced core diameter section 206 of a length L2', with a core 212 of a diameter Dco_2' and a cladding 214a, with a diameter Dcl_2' smaller than Dcl_1', (or, optionally, a cladding 214a', with a diameter corresponding to Dcl_1', followed by a second PM fiber section 202b, comprising a core 208b of diameter Dco_1' and a cladding 210b of a diameter Dcl_1' at its output end F, respectively, with the cores 208a, 208b, 212 having at least one core mode, and the claddings 210a, 210b, 214a (or 214a') having at least one cladding mode. The polarizer 200 preferably comprises two propagation constants (e.g., respective core 208a, 208b, 212 and cladding 210a, 210b, 214a (or 214a') propagation constants), that each correspond to one of a "fast" and of a "slow" polarization components of the input light signal 150. The polarizer 200 is configured, and operates, in substantially the same manner as described above in connection with the variant of the polarizer 10 of FIG. 1, in which the values of L1 and L3 are substantially zero, resulting in abrupt transitions to, and from, a lower value core diameter in the reduced core diameter section 16 of FIG. 1, corresponding to the reduced core diameter section 206 of FIG. 3.

In accordance with the present invention, the values of the respective core 208a, 208b, 212 and cladding 210a, 210b, 214 propagation constants, L2', and Dco_2 (and optionally of Dcl_2' (and/or of Dcl_1', if the cladding 214a' is utilized), are selected and configured to first partially couple at least one core mode of the light signal 150, to at least one polarizer 200 cladding mode, and then partially couple the coupled light signal back into at least one of the at least one polarizer 200 core mode and at least one other polarizer 200 cladding mode, and are further selected and configured to produce a constructive interference for one light polarization of the light signal 150, corresponding to the desired polarization, and to produce a destructive interference for a polarization orthogonal to the desired polarization, to thereby impart a polarizing effect on the core mode light signal transmission at the least one wavelength transmitted therethrough, resulting in the output light signal 150b, at the polarizer 200 output F, having the desired polarization, and being of the at least one predetermined wavelength.

Advantageously, the inventive polarizer 200 may be configured as a "splice-in" component with either point A as input and point F as output, or, if cladding 214a' is utilized, to facilitate easier splicing, it may simply comprise the reduced core diameter section 206 spliced between two ends of conventional PM optical fibers at points B,C and D,E.

Figure 4A:
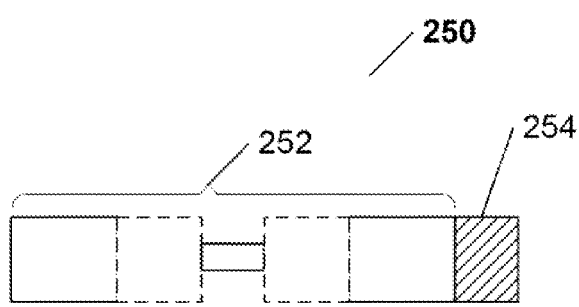
FIG. 4A is a schematic diagram of a side view of a second exemplary embodiment of the polarization maintaining optical fiber polarizer of the present invention.

Referring now to FIG. 4A, a second exemplary embodiment of the present invention is shown as a polarizer 250, representative of a modified version of any of the previously discussed inventive polarizers, 10, 100 and 200, of FIGS. 1 to 3, respectively. Because not all cladding mode light may in fact be coupled back into the core mode at the output of the polarizer element 252 (corresponding to any of the inventive polarizers 10, 100, 200), it may be useful to provide a component 254 at the polarizer element 252 output end, that is specially configured to reduce or substantially eliminate cladding mode propagation therethrough. The component 252 preferably corresponds in core and cladding diameter to the conventional PM optical fiber (or the fiber component) to which the polarizer element 252 is to be connected, but includes structural modifications operable to reduce cladding mode propagation therethrough by scattering, or otherwise dispersing, light traveling in the cladding mode so that it does not couple back into the core mode. This modification may be accomplished in a number of different ways, such as surrounding the component 254 with matching index contrast material, or supplying a component 254 with a modified cross-section and then twisting it.

Figure 4B:
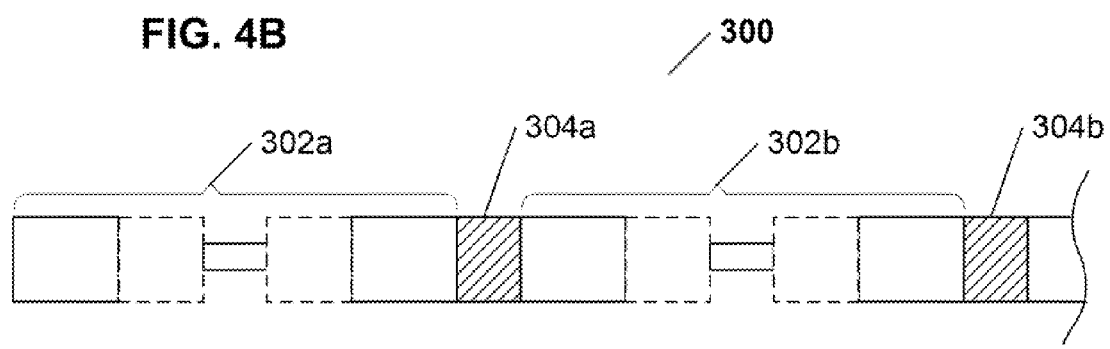
FIG. 4B is a schematic diagram of a side view of a first exemplary alternate embodiment of the polarization maintaining optical fiber polarizer of FIG. 4A.

Referring now to FIG. 4B, a first alternate exemplary embodiment of the polarizer 250 of FIG. 4A is shown as a polarizer 300, representative of two or more inventive polarizers 250, shown in FIG. 4A, positioned sequentially with one another, forming a multi-component polarizer of a higher efficiency and improved performance. By way of example, the polarizer 300 is shown as comprising a first polarizer component 302a (corresponding to polarizer element 252 of FIG. 4A), followed by a core mode propagation dispersal component 304a 302a (corresponding to component 254 of FIG. 4A), and then followed by another polarizer component 302b, and corresponding component 304b.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical fiber polarizer for imparting a predetermined desired polarization to a light signal transmission of a predetermined at least one wavelength transmitted therethrough, comprising:
   a polarization maintaining optical fiber structure of a first diameter having a core and a cladding surrounding said core, having at least one core mode, and at least one cladding mode, and having a corresponding core propagation constant, and a corresponding cladding propagation constant, said optical fiber structure comprising at least one sequential polarizer element, each comprising:
   a diameter decrease transition fiber section of a first transition length, transitioning down from said first diameter to a second diameter, smaller than said first diameter;
   a diameter increase transition fiber section of a second transition length, transitioning up from said second diameter to said first diameter; and
   an elongated substantially uniform fiber section of a predetermined length and of said second diameter, positioned between said diameter decrease transition fiber section, and diameter increase transition fiber section, wherein said core and said cladding propagation constants, said first transition length, said second transition length, said predetermined length, and said second diameter, are selected and configured to first partially couple at least one core mode of said light signal of said predetermined at least one wavelength, to said at least one cladding mode, and then partially couple said coupled light signal back into at least one of said at least one core mode and at least one other cladding mode, and are further selected and configured to produce a constructive interference for one light polarization of the light signal, corresponding to the desired polarization, and to produce destructive interference for a polarization orthogonal to said desired polarization, to thereby impart a polarizing effect on said core mode light signal transmission at the least one wavelength transmitted therethrough.

2. The optical fiber polarizer of claim 1, wherein at least one of said first transition length and said second transition length, is substantially equal to zero.

3. The optical fiber polarizer of claim 1, wherein said diameter decrease transition fiber section comprises a tapered down fiber section, tapering down from said first diameter to said second diameter over said first transition length.

4. The optical fiber polarizer of claim 1, wherein said diameter increase transition fiber section comprises a tapered up fiber section, tapering up from said second diameter to said first diameter over said second transition length.

5. The optical fiber polarizer of claim 1, wherein said polarization maintaining optical fiber structure comprises:
   a plurality of said sequential polarizer elements; and
   an interface element of said first diameter, positioned longitudinally between each plural sequential polarizer element, and configured to comprise reduced cladding mode propagation therein, operable to substantially scatter a light signal propagating therethrough in said at least one cladding mode or said at least one other cladding mode.

6. The optical fiber polarizer of claim 1, wherein said core propagation constant is of a different value than said cladding propagation constant.

* * * * *